May 13, 1930. P. P. KERRIGAN 1,758,521
COMBINED PIPE CUTTING AND BUR REMOVING TOOL
Filed March 1, 1927
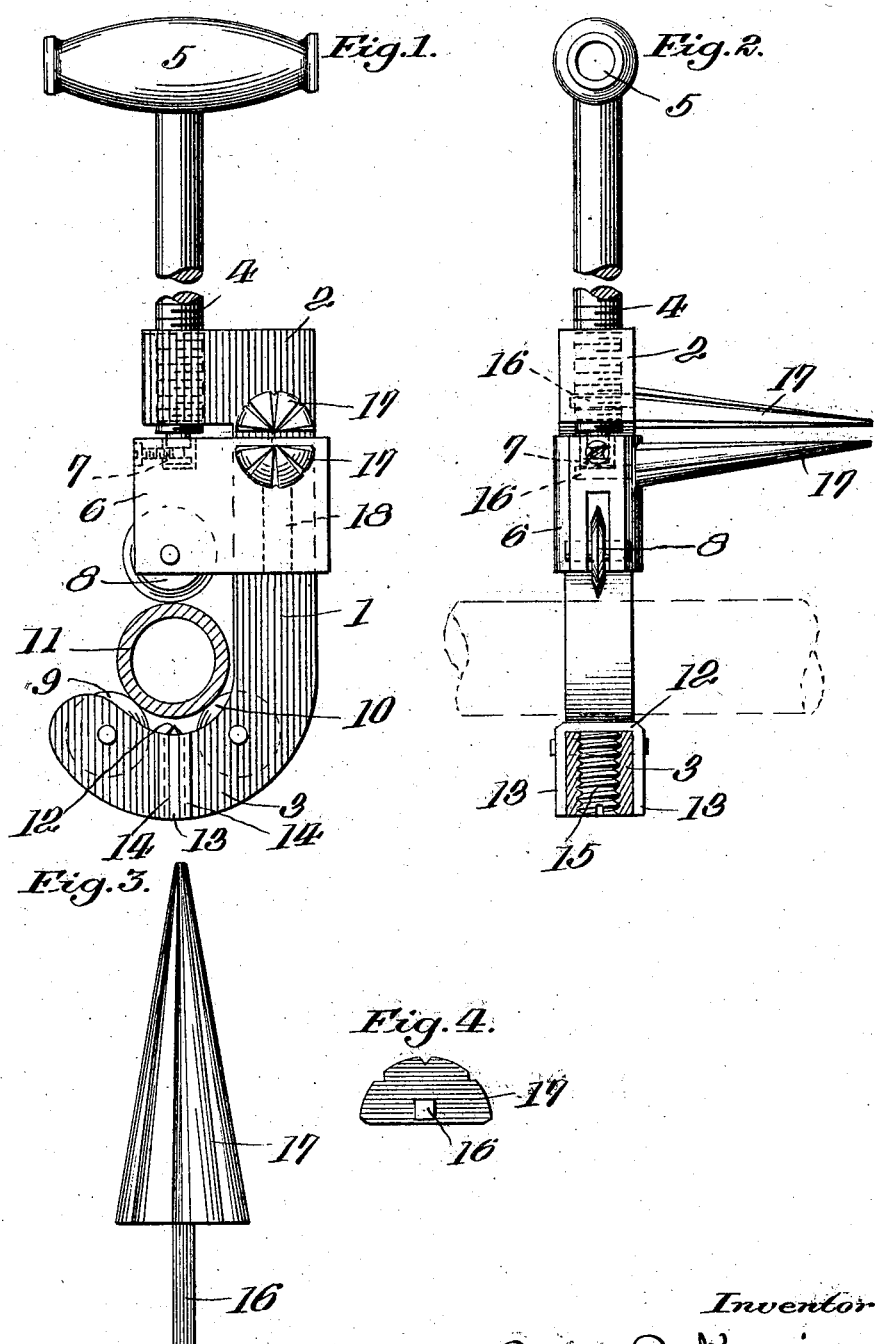
Inventor:
Philip P. Kerrigan
By Riordan & Riordan
Att'y.

Patented May 13, 1930

1,758,521

UNITED STATES PATENT OFFICE

PHILIP P. KERRIGAN, OF FORTRESS MONROE, VIRGINIA

COMBINED PIPE-CUTTING AND BUR-REMOVING TOOL

Application filed March 1, 1927. Serial No. 171,843.

This invention relates to compound tools and has for its object the provision of a pipe or rod cutter having included therein means for removing the bur formed by the cutting operation whereby a saving of time and labor will be effected.

Secondary objects of the invention will appear in the course of the following description and the invention resides in certain novel features which will be particularly pointed out in the appended claims.

In the drawing:

Fig. 1 is a side elevation of a tool embodying the invention;

Fig. 2 is a front elevation with a part in section;

Fig. 3 is a plan view of a bur cutter; and

Fig. 4 is an end view of the device shown in Fig. 3.

In the drawing, the reference numeral 1 designates the body or frame of the tool having an arm 2 at its upper end and a curved foot 3 at its lower end, the foot and arm projecting from the body in the same direction. Through the arm is formed a threaded bore in which is engaged a feed screw 4 provided at its upper end with a handle 5 of any approved design. A head 6 is slidably mounted on the body 1 and the lower end of the feed screw is swiveled in the head, as indicated at 7, so that by rotating the feed screw the cutter 8, carried by the head will be adjusted toward or from the foot. Mounted in the toe and heel of the foot are cutters 9 and 10, which are adapted to cooperate with the cutter 8 in cutting through a pipe or rod, shown at 11, it being noted that the cutters are disposed in triangular relation to encircle the pipe with the cutter 8 mounted on the axis of the feed screw 4, which passes midway between the cutters 9 and 10. While these cutters may be of any desired form, I prefer to employ rotatably mounted disks having sharp cutting peripheries, as illustrated.

In a plane midway between the cutters 9 and 10, is a scraper or bur remover 12, in the form of a bridle spanning the foot 3 and having its side member 13 slidably engaged between guides 14 provided on the sides of the foot. A combined supporting and adjusting screw 15 is mounted in the foot, as shown most clearly in Fig. 2, to bear against the bridge portion of the scraper to firmly support the same and adjust it to exert the required pressure against the pipe.

The body 1 is flat-sided or non-circular in cross section and the head 6 has an opening of corresponding form to receive the body so that twisting of the head upon the body will be prevented. Engaged in the head and in the body just above the head are the shanks or stems 16 of elongated mating, semi-conical reamers or cutters 17, the shanks or stems being of sufficient length to pass entirely through the members engaged by them so that they may be mounted on either side of the tool, as may be most convenient. The stem of the lower cutter 17 passes through a longitudinal slot 18 in the body and thereby provides an additional means for guiding the head and limiting its movement so that the cutters cannot be jammed in the pipe and damaged.

In practice, the pipe to be cut is engaged by the cutters, as shown in Fig. 1, while it is held in a vise or otherwise secured against movement. The entire tool is then rotated about the pipe, the feed screw being constantly adjusted to maintain the biting engagement of the cutters with the pipe. The cutters will thus be caused to cut through the pipe in a diametrical plane of the same and eventually will cut through the entire thickness of the pipe wall. The action of the cutters forms a bur on the surface of the pipe, and, just as the cutters break through the pipe wall, the scraper 12 engages the outer surface of the pipe so that during the continued rotation of the tool it will cut or scrape away the bur, leaving the surface of the pipe smooth and even. After the tool is removed from the pipe, the reamers 17 are inserted in the pipe and rotated so as to remove the bur formed on the inner surface of the pipe wall.

It will be seen that I have provided a very simple and compact tool by the use of which a pipe may be expeditiously cut and the bur formed in cutting will be removed in one continuous operation.

Having thus fully described my invention, what I claim as new and desire to secure by Letters Patent of the United States is:

1. In a compound tool of the class described, the combination of a body having a slot therein, a head slidable on said body adjacent said slot and carrying a plurality of tool elements, one of said elements having a portion projecting into said slot thereby to guide the head and another portion projecting externally of the head.

2. In a compound tool of the class described, a body having a slot therein and a foot, said foot carrying a pipe cutting element and a bur removing element, a head slidable on said body adjacent said slot and carrying a plurality of tool elements, one of said elements having a portion projecting into the slot, thereby to guide the head and a portion projecting externally of the head, the other of said elements on the head being cooperative with the pipe cutting element on said foot, said bur removing element being located adjacent the pipe cutting element on the foot whereby to engage the work substantially at the time of cutting of a pipe, said foot having guides in which the bur removing element is slidable and an adjusting screw engageable with said element to support and adjust the same.

3. In a compound tool of the class described, the combination of a body carrying a pipe cutting element, said body being slotted, a head slidable on the body and carrying a second pipe cutting element, a two-part tool having one part mounted on said body, and the other part thereof mounted on said head, said tool having a portion extending into said slot to limit movement of the head, and means to adjust said head on said body thereby to vary the effective distance between said pipe cutting elements.

In testimony whereof I hereunto affix my signature.

PHILIP P. KERRIGAN.